US008962216B2

(12) United States Patent
Hirakimoto et al.

(10) Patent No.: US 8,962,216 B2
(45) Date of Patent: Feb. 24, 2015

(54) ION-CONDUCTING COMPOSITE ELECTROLYTE MEMBRANE AND FUEL CELL USING THE SAME

(75) Inventors: Takuro Hirakimoto, Kanagawa (JP); Kazuaki Fukushima, Kanagawa (JP); Kenji Kishimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 99 days.

(21) Appl. No.: 13/387,320

(22) PCT Filed: Jul. 21, 2010

(86) PCT No.: PCT/JP2010/062236
§ 371 (c)(1),
(2), (4) Date: Feb. 1, 2012

(87) PCT Pub. No.: WO2011/016336
PCT Pub. Date: Feb. 10, 2011

(65) Prior Publication Data
US 2012/0129077 A1    May 24, 2012

(30) Foreign Application Priority Data

Aug. 3, 2009 (JP) ............................. P2009-180513

(51) Int. Cl.
*H01M 8/10* (2006.01)
*H01B 1/12* (2006.01)

(52) U.S. Cl.
CPC ............ *H01M 8/1041* (2013.01); *H01B 1/122* (2013.01); *H01M 8/1011* (2013.01); *H01M 8/1023* (2013.01); *H01M 8/1032* (2013.01); *H01M 8/1081* (2013.01); *H01M 2300/0088* (2013.01); *Y02E 60/523* (2013.01)
USPC ............................. 429/494; 429/492; 429/493

(58) Field of Classification Search
CPC   H01M 8/1025; H01M 8/1027; H01M 8/1039
See application file for complete search history.

(56) References Cited

U.S. PATENT DOCUMENTS

2004/0180250 A1* 9/2004 Nanaumi et al. ............... 429/33
2009/0117439 A1* 5/2009 Fujinami et al. ............... 429/33
2009/0325026 A1* 12/2009 Ishitobi et al. .................. 429/33

FOREIGN PATENT DOCUMENTS

| JP | 2005-068124 | 3/2005 |
| JP | 2005-093417 | 4/2005 |
| JP | 2006-079944 | 3/2006 |

(Continued)

OTHER PUBLICATIONS

JP 2009013377 A English Machine Translation.*

*Primary Examiner* — Ula C. Ruddock
*Assistant Examiner* — Scott J Chmielecki
(74) *Attorney, Agent, or Firm* — K&L Gates LLP

(57) ABSTRACT

An ion-conducting composite electrolyte membrane with strength improved without impairing ionic conductivity, and a fuel cell using the same are provided. The proton conductive composite electrolyte membrane includes an electrolyte which includes an ion-dissociating functional group and is made of a fullerene derivative or sulfonated pitch within a range of 5 wt % to 85 wt % both inclusive, and a binder which has a weight-average molecular weight of 550000 or over and a logarithmic viscosity of 2 dL/g or over, and is made of a fluorine-based polymer such as polyvinylidene fluoride and a copolymer of polyvinylidene fluoride and hexafluoropropylene within a range of 15 wt % to 95 wt % both inclusive.

7 Claims, 11 Drawing Sheets

(56) References Cited

FOREIGN PATENT DOCUMENTS

| | | |
|---|---|---|
| JP | 2007-257882 | 10/2007 |
| JP | 2008-108677 | 5/2008 |
| JP | 2009-013377 | 1/2009 |
| JP | 2009013377 A * | 1/2009 |
| JP | 2009-043674 | 2/2009 |
| WO | WO 2008010605 A1 * | 1/2008 |

* cited by examiner

| ELECTROLYTE | CARBON CLUSTER INCLUDING ION-DISSOCIATING GROUP (FULLERENE DERIVATIVE, SULFONATED PITCH) | 5wt% TO 85wt% BOTH INCLUSIVE |
|---|---|---|
| BINDER (MATRIX) | FLUORINE-BASED POLYMER (WEIGHT-AVERAGE MOLECULAR WEIGHT:550000 OR OVER, LOGARITHMIC VISCOSITY:2 OR OVER) (POLYVINYLIDENE FLUORIDE, COPOLYMER OF POLYVINYLIDENE FLUORIDE AND HEXAFLUOROPROPYLENE) | 15wt% TO 95wt% BOTH INCLUSIVE |

FIG. 1

REACTION IN DMFC

ANODE REACTION
$CH_3OH + H_2O \rightarrow CO_2 + 6H^+ + 6e^-$
CATHODE REACTION
$(3/2)O_2 + 6H^+ + 6e^- \rightarrow 3H_2O$
TOTAL REACTION
$CH_3OH + (3/2)O_2 \rightarrow CO_2 + 2H_2O$ REACTION IN PEFC
  ANODE REACTION
  $H_2 \rightarrow 2H^+ + 2e^-$
  CATHODE REACTION
  $2H^+ + (1/2)O_2 + 2e^- \rightarrow H_2O$
  TOTAL REACTION
  $H_2 + (1/2)O_2 \rightarrow H_2O$ (A)

| | LOGARITHMIC VISCOSITY [η] | AVERAGE OUTPUT (W) | OUTPUT RETENTION RATE (%) | SWELLING DEGREE (%) | ELECTRODE EXFOLIATION |
|---|---|---|---|---|---|
| COMPARATIVE EXAMPLE 1 | 1 | 0.23 | 50 | 2.0 | × |
| COMPARATIVE EXAMPLE 2 | 1.5 | 0.25 | 65 | 1.8 | × |
| EXAMPLE 1 | 2 | 0.48 | 96 | 1.4 | ○ |
| EXAMPLE 2 | 5 | 0.50 | 95 | 1.2 | ○ |
| EXAMPLE 3 | 10 | 0.52 | 97 | 1.2 | ○ |

(B)

(C)

(A)

| | LOGARITHMIC VISCOSITY | BREAK ELONGATION (%) | BREAK ELONGATION (RELATIVE VALUE) |
|---|---|---|---|
| COMPARATIVE EXAMPLE 3 | 1 | 17 | 1.0 |
| COMPARATIVE EXAMPLE 4 | 1.5 | 24 | 1.4 |
| EXAMPLE 4 | 2 | 42 | 2.8 |
| EXAMPLE 5 | 5 | 49 | 2.9 |
| EXAMPLE 6 | 10 | 54 | 3.2 |

(B)

ION-CONDUCTING COMPOSITE ELECTROLYTE MEMBRANE AND FUEL CELL USING THE SAME

CROSS REFERENCES TO RELATED APPLICATIONS

The present application is a national stage of International Application No. PCT/JP2010/062236 filed on Jul. 21, 2010 and claims priority to Japanese Patent Application No. 2009-180513 filed on Aug. 3, 2009, the disclosures of which are incorporated herein by reference.

BACKGROUND

The present invention relates to an ion-conducting composite electrolyte membrane and a fuel cell using the same.

Since fuel cells converting chemical energy into electrical energy are efficient, and do not produce environmental pollutants, the fuel cells have drawn attention as clean power supplies for portable information devices, household use, vehicles, and the like, and the development of the fuel cells have been promoted.

There are various types of fuel cells classified according to the kinds of used electrolytes, and in particular, a fuel cell using an organic material such as methanol or hydrogen as a fuel has drawn attention. Important constituent elements determining the output performance of such a fuel cell include an electrolyte, an electrolyte membrane, a catalyst membrane, and a membrane-electrode assembly (MEA) formed by sandwiching an electrolyte membrane between catalyst membranes. For example, various types of electrolytes have been developed, and an electrolyte made of a perfluorosulfonic-acid-based resin is a representative example, and is considered superior in durability and performance.

The important constituent elements of the fuel cell determine not only output performance of the fuel cell, but also reliability and durability for ensuring a long-term stable operation, and the important constituent elements also relate to productivity thereof, and exert an influence on manufacturing efficiency and production cost. Various methods for an improvement in performance of an electrolyte membrane have been reported.

The electrolyte membrane is used to form a membrane-electrode assembly (MEA), and a unit cell is configured with use of the membrane-electrode assembly; therefore, the electrolyte membrane is used in a stack type fuel cell in which a plurality of unit cells are stacked, and are connected to one another in series, or a planar stack type fuel cell in which a plurality of unit cells are arranged in a planar form, and are connected to one another in series.

A large number of methods of forming an electrolyte membrane used in a fuel cell have been reported (refer to the following PTLs 1 to 5).

For example, in the following PTL 1 entitled "proton conductive complex and its method for manufacture, and electrochemical device", there is described "a proton conductive complex which is formed by mixing a carbon cluster including a proton dissociative functional group, and a polymer material having resistance to permeation of water and/or liquid molecules such as alcohol molecules, and includes the polymer material at a mixing ratio of larger than 15 mass % to 95 mass % inclusive (more specifically at a mixing ratio of 20 mass % to 90 mass % both inclusive).

It is to be noted that a proton-conducting polymer using a fullerene $C_{60}$ is known (refer to the following PTLs 1 and 6), and the above-described planar stack type fuel cell is described in, for example, the following PTL 7.

CITATION LIST

Patent Literature

[PTL 1] Japanese Unexamined Patent Application Publication No. 2005-093417 (paragraphs 0022, and 0056 to 0072)
[PTL 2] Japanese Unexamined Patent Application Publication No. 2006-79944 (paragraphs 0017 to 0019, 0028 to 0029, and 0034 to 0035)
[PTL 3] Japanese Unexamined Patent Application Publication No. 2007-257882 (paragraphs 0132 to 0137)
[PTL 4] Japanese Unexamined Patent Application Publication No. 2009-13377 (paragraphs 0031 to 0032)
[PTL 5] Japanese Unexamined Patent Application Publication No. 2009-43674 (paragraphs 0028 to 0030)
[PTL 6] Japanese Unexamined Patent Application Publication No. 2005-68124 (paragraphs 0087 to 0106)
[PTL 7] Japanese Unexamined Patent Application Publication No. 2008-108677 (paragraphs 0015 to 0049, FIGS. 1 to 10)

SUMMARY

Properties of an electrolyte membrane as an important main constituent element of a fuel cell determine output performance of the fuel cell as well as long-term stable operation and durability, and relate to productivity of the whole fuel cell, thereby exerting an influence on manufacturing efficiency and production cost; therefore, high strength, in addition to high ionic conductivity, is demanded. Therefore, in addition to the electrolyte, a binder for mutually binding (bonding) electrolytes to form a membrane exerts a large influence on the properties of the electrolyte membrane, and also exerts an influence on productivity of the whole fuel cell.

PVdF is known as a representative example of the binder used to form the electrolyte membrane; however, in the case where the molecular weight of PVdF is low, the electrolyte membrane is brittle, thereby causing issues such as a crack opened in the electrolyte membrane during a step of assembling a cell of a fuel cell, or during operation (power generation) of the fuel cell.

In particular, in the case where a unit cell is configured with use of a membrane-electrode assembly (MEA), and a fuel cell system such as a stack type fuel cell in which a plurality of unit cells are stacked, and are connected to one another in series, or a planar stack type fuel cell in which a plurality of unit cells are arranged in a planar form, and are connected to one another in series is formed, a step of applying heat or pressure to the electrolyte membrane is not avoidable; therefore, when the strength of the electrolyte membrane is not sufficient, such a step causes a break or the like in the electrolyte membrane, thereby causing a decline in yields.

The present invention is made to solve the above-described issues, and it is an object of the invention to provide an ion-conducting composite electrolyte membrane with strength improved without impairing ionic conductivity, and a fuel cell using the same.

The present invention relates to an ion-conducting composite electrolyte membrane including a mixture of: a carbon cluster (for example, a fullerene derivative or sulfonated pitch in an embodiment which will be described later) including an ion-dissociating group (for example, a sulfonic acid group ($-SO_3H$)) in the embodiment which will be described later); and a fluorine-based polymer (for example, a copolymer of vinylidene fluoride and hexafluoropropylene in the embodiment which will be described later) with a weight-average molecular weight of 550000 or over and a logarithmic viscosity (a method of measuring logarithmic viscosity will be described in detail later) of 2 dL/g or over.

Moreover, the present invention relates to a fuel cell including: the above-described ion-conducting composite electrolyte membrane sandwiched between facing electrodes.

According to the invention, the carbon cluster including an ion-dissociating group and the fluorine-based polymer with a weight-average molecular weight of 550000 or over and a logarithmic viscosity of 2 dL/g or over are mixed to form the ion-conducting composite electrolyte membrane; therefore, an ion-conducting composite electrolyte membrane with strength improved without impairing ionic conductivity is allowed to be provided.

Moreover, according to the invention, the above-described ion-conducting composite electrolyte membrane is sandwiched between the facing electrode; therefore, a fuel cell having high productivity and superior characteristics are allowed to be provided.

Additional features and advantages are described herein, and will be apparent from the following Detailed Description and the figures.

BRIEF DESCRIPTION OF THE FIGURES

FIG. 1 is a diagram describing a structure of an ion-conducting composite electrolyte according to an embodiment of the invention.

DETAILED DESCRIPTION

Figure 2:
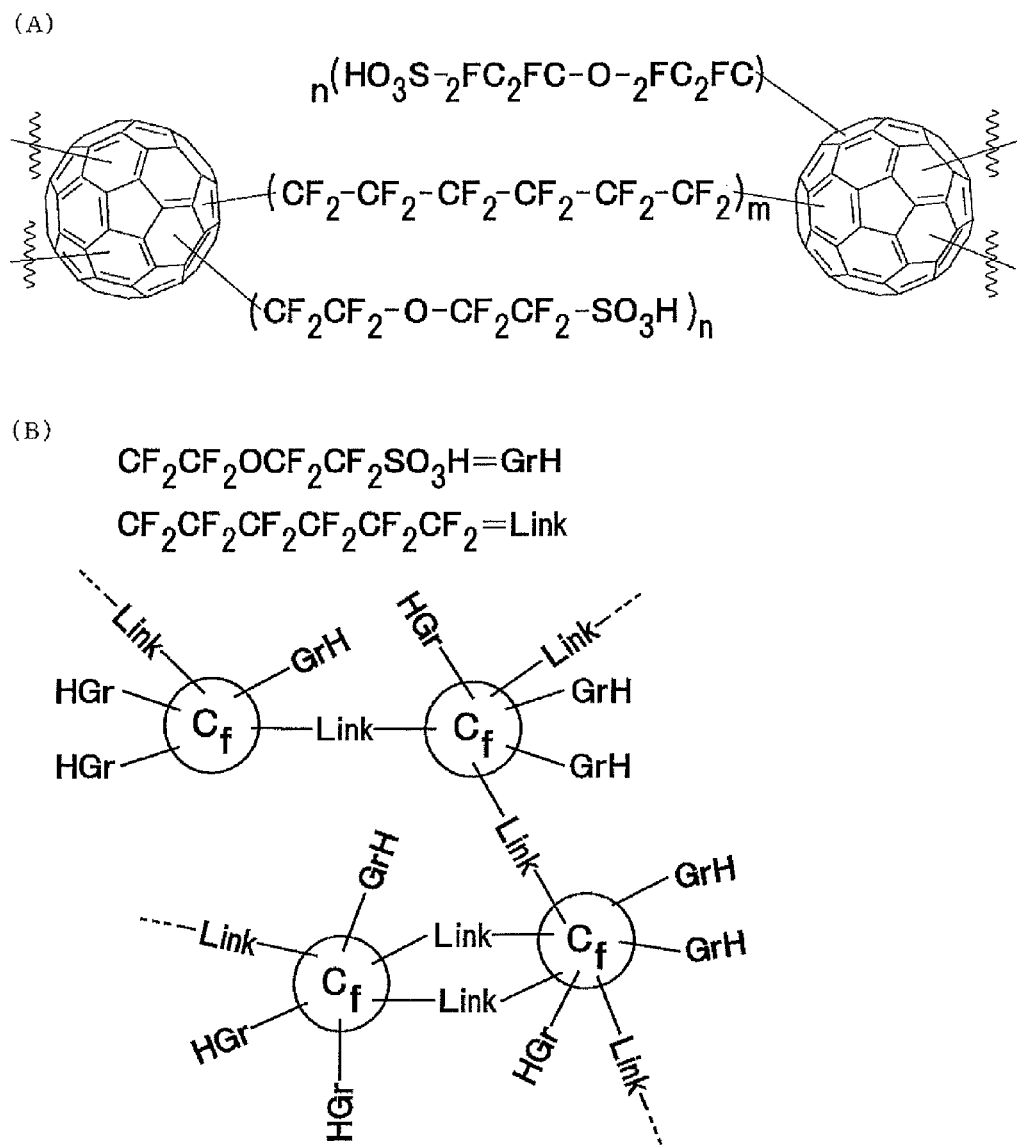
FIG. 2 is a diagram describing a fullerene derivative including a cation-dissociating functional group according to the embodiment of the invention.

In an ion-conducting composite electrolyte membrane of the invention, the logarithmic viscosity of a fluorine-based polymer may be 10 dL/g or less. More preferably, the logarithmic viscosity of the fluorine-based polymer may be 3 dL/g or over. In the ion-conducting composite electrolyte membrane with such a structure, strength is allowed to be improved without impairing ionic conductivity thereof, and the ion-conducting composite electrolyte membrane is preferably applicable to a fuel cell, and a fuel cell with superior characteristics is achievable.

Moreover, the fluorine-based polymer may be mixed within a range of 15 wt % to 95 wt % both inclusive. Further, the fluorine-based polymer may include at least one kind selected from the group consisting of polyvinylidene fluoride and copolymers of vinylidene fluoride and hexafluoropropylene. In the ion-conducting composite electrolyte membrane with such a structure, strength is allowed to be improved without impairing ionic conductivity thereof, and the ion-conducting composite electrolyte membrane is preferably applicable to a fuel cell, and a fuel cell with superior characteristics is achievable.

Moreover, an ion-dissociating group may be a proton-dissociative group. The ion-conducting composite electrolyte membrane with such a structure is preferably applicable to a fuel cell using an organic material such as methanol or hydrogen as a fuel, and a fuel cell with superior characteristics is achievable.

Further, the proton-dissociative group may include at least one kind selected from the group consisting of a hydroxyl group (—OH), a sulfonic acid group (—$SO_3H$), a carboxyl group (—COOH), a phosphonic group (—$PO(OH)_2$), a dihydrogen phosphate ester group (—O—$PO(OH)_2$), a phosphono methano group (=$CH(PO(OH)_2)$), a diphosphono methano group (=$C(PO(OH)_2)_2$), a phosphono methyl group (—$CH_2(PO(OH)_2)$), a diphosphono methyl group (—$CH(PO(OH)_2)_2$), a phosphine group (—PHO (OH)), a disulfono methano group (=$C(SO_3H)_2$), a bis-sulfonimide group (—$SO_2NHSO_2$—), and sulfonamide groups (—$SO_2NH_2$), —PO(OH)—, and —O—PO(OH)—. The ion-conducting composite electrolyte membrane with such a structure is preferably applicable to a fuel cell.

Moreover, a carbon cluster may be a fullerene derivative or sulfonated pitch. The ion-conducting composite electrolyte membrane with such a structure is preferably applicable to a fuel cell.

Next, a preferred embodiment of the invention will be described in detail below referring to the accompanying drawings.

[Embodiment]
[Structure of Ion-Conducting Composite Electrolyte Membrane]

FIG. 1 is a diagram describing a structure of an ion-conducting composite electrolyte according to an embodiment of the invention.

The ion-conducting composite electrolyte membrane according to the embodiment includes, as an electrolyte, a carbon cluster including an ion-dissociating functional group within a range of 5 wt % to 85 wt % both inclusive, and a binder as a matrix of the electrolyte within a range of 15 wt % to 95 wt % both inclusive.

In the case where the binder content in the electrolyte membrane is smaller than 15 wt %, membrane formability declines to cause difficulty in formation of a fine membrane, thereby causing a decline in strength of the electrolyte. The binder content is preferably 20 wt % or over, and more preferably 25 wt % or over. When the binder content exceeds 95 wt %, ionic conductivity declines. The binder content is preferably 90 wt % or less, and more preferably 85 wt % or over.

The carbon cluster is, for example, a fullerene derivative derived from a fullerene molecule $C_k$ (k=36, 60, 70, 76, 78, 80, 82, 84, or the like; a spherical carbon cluster molecule), or a pitch material into which a sulfonic acid group is introduced (hereinafter referred to as "sulfonated pitch").

The ion-dissociating functional group is, for example, a hydroxyl group —OH, mercapto group —SH, a carboxyl group —COOH, a sulfonic acid group —$SO_2OH$, a sulfonamide group —$SO_2NH_2$, a bis-sulfonimide group —$SO_2NHSO_2$—, a bis-sulfonimide group —$SO_2NHSO_2$—, a sulfone carbonimide group —$SO_2NHCO$—, a biscarbonimide group —CONHCO—, a phosphono methano group =CH(PO(OH)$_2$), a diphosphono methano group =C(PO(OH)$_2$)$_2$, a disulfono methano group (=C(SO$_3$H)$_2$), a phosphono methyl group —$CH_2$(PO(OH)$_2$), a diphosphono methyl group —CH(PO(OH)$_2$)$_2$, a sulfino group —SO(OH), a sulfeno group —SOH), a sulfuric acid group —$OSO_2OH$, a phosphonic acid group —PO(OH)$_2$, a phosphine group —HPO(OH), a phosphoric acid group —O—PO(OH)$_2$ or —OPO(OH)O—, a phosphonyl group —HPO, a phosphinyl group —$H_2$PO, or the like, and may be a derivative formed by replacing any of these proton-dissociative groups with a substituent group.

The binder is made of a fluorine-based resin having a weight-average molecular weight of 550000 or over, and includes at least one kind selected from the group consisting of polyvinylidene fluoride (PVdF) and compolymers of polyvinylidene fluoride and hexafluoropropylene.

A method with use of GPC (gel permeation chromatography) or the like is used to measure the molecular weight of a polymer; however, when the molecular weight is large, it is difficult to measure the molecular weight. In the description, logarithmic viscosity [η] correlated to the molecular weight is used as a parameter. The logarithmic viscosity [η] increases with an increase in the molecular weight.

A binder with a logarithmic viscosity [η] of 2 dL/g or over, preferably with a logarithmic viscosity [η] of 3 dL/g to 10 dL/g both inclusive is used.

In the case where the binder has a logarithmic viscosity [η] of smaller than 2 dL/g, adhesion of the binder to the electrolyte is not sufficient, and the binder does not effectively function as a matrix binding electrolytes, and on the other hand, in the case where the binder has a logarithmic viscosity [η] of larger than 10 dL/g, workability during the formation of an electrolyte membrane declines; therefore, the binder preferably has a logarithmic viscosity [η] of 2 dL/g to 10 dL/g both inclusive.

Moreover, to achieve a fuel cell having a high output value and a high output retention rate (which will be described later), the electrolyte membrane preferably has low wettability (which will be described later), and to further reduce the wettabiltiy of the electrolyte membrane, a binder with a logarithmic viscosity [η] of 3 dL/g or over is preferably used. In consideration of workability during formation of the electrolyte membrane, a binder with a logarithmic viscosity [η] of 3 dL/g to 10 dL/g both inclusive is preferably used.

In the invention, logarithmic viscosity [η] is defined by [η]=ln(η$_m$)/C, that is, by dividing a natural logarithm η$_m$ by a concentration C of a sample solution, where η$_m$ (Pa·s (pascal-second)) is a measured value of viscosity at 30° C. of a solution (a sample solution with a concentration C=4 (g/L)) prepared by dissolving 4 g of a sample (a resin to be subjected to molecular weight measurement) in 1 liter of N,N-dimethylformamide.

It is to be noted that in the embodiment, viscosity η$_m$ (Pa·s (pascal-second)) is determined at a shear rate (an angular velocity) where shear stress is constant when the shear rate is varied from 0 to 2000 (sec-1) by a viscometer (Rheostress 600, manufactured by HAAKE GmbH).

FIG. 2 is a diagram describing a fullerene derivative including a proton-dissociative group in the embodiment of the invention.

As illustrated in FIG. 2(A), the fullerene derivative has a structure in which fullerene matrices ($C_{60}$) each formed by bonding, to a fullerene ($C_{60}$), a number n of groups having a sulfonic acid group (—$SO_3H$) at an end as a proton-dissociative group, i.e., —$CF_2CF_2$—O—$CF_2CF_2$—$SO_3H$ are mutually bonded through a number m of linking groups, —$CF_2CF_2CF_2CF_2CF_2CF_2$—.

As illustrated in FIG. 2(B), the fullerene derivative is a polymer having a structure in which the fullerene matrices ($C_{60}$) are linked to one another through Links, and a plurality of GrHs are bonded to each of the fullerene matrices ($C_{60}$), where the group having the sulfonic acid group (—$SO_3H$) at an end, —$CF_2CF_2$—O—$CF_2CF_2$—$SO_3H$ is abbreviated to —GrH, and the linking group —$CF_2CF_2CF_2CF_2CF_2CF_2$—is abbreviated to -Link-.

Figure 3:
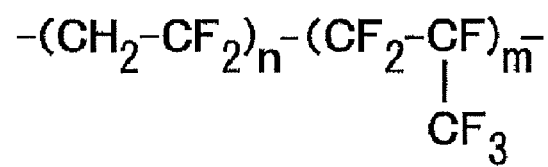
FIG. 3 is a diagram illustrating a PVdF-HFP copolymer according to the embodiment of the invention.

FIG. 3 is a diagram describing a PVdF-HFP copolymer used as a binder in the embodiment of the invention.

As illustrated in FIG. 3, the PVdF-HFP compolymer used as the binder to form the electrolyte membrane is a copolymer of polyvinylidene fluoride (PVdF), ($CH_2CF_2$)$_n$, and hexafluoropropylene (HFP), ($CF_2CF(CF_3)$)$_m$, and the copolymer is an alternating copolymer, a periodic copolymer, a random copolymer, a block copolymer, or a mixture thereof (Fuel cell using ion-conducting composite electrolyte membrane in the invention)

Next, an example of a fuel cell using the ion-conducting composite electrolyte membrane will be described below.

Figure 4:
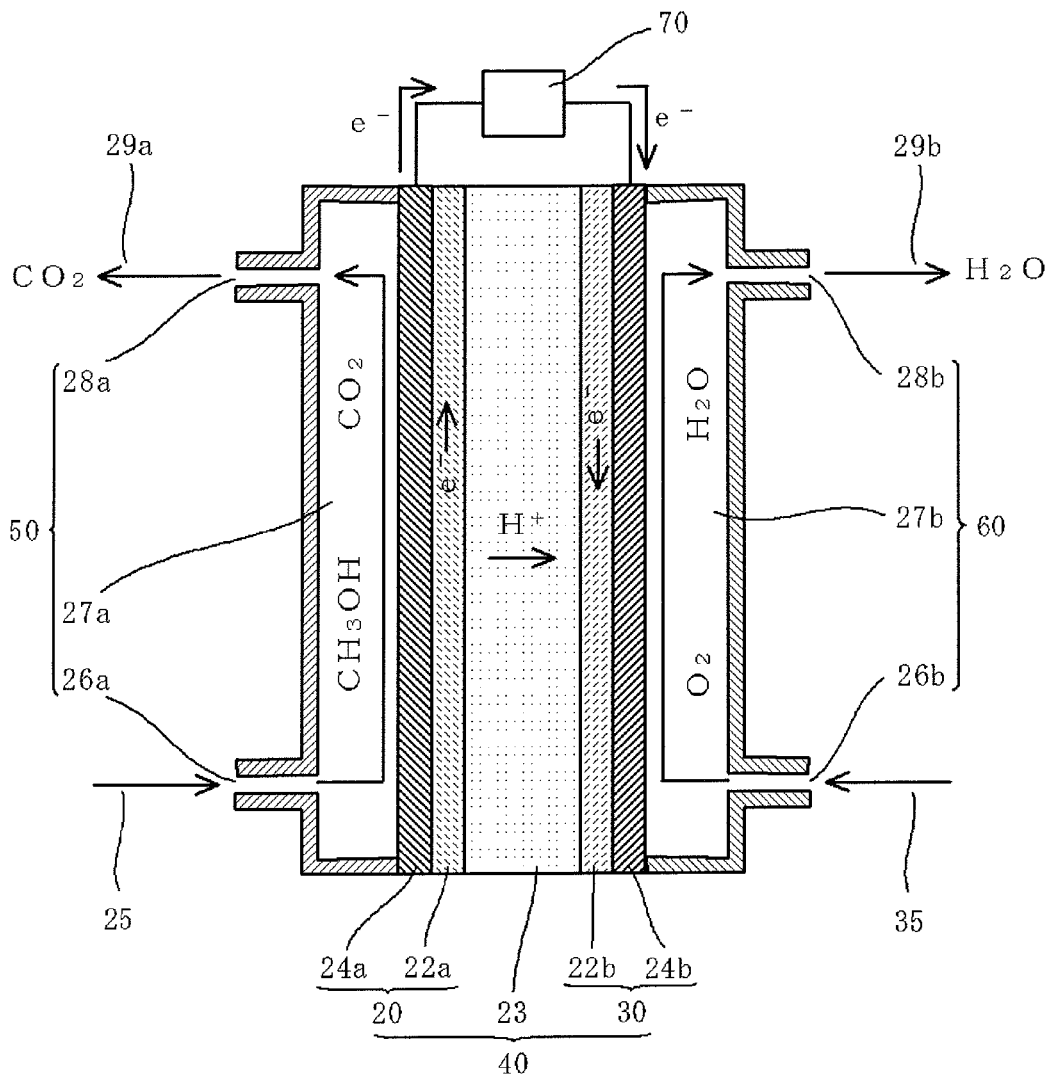
FIG. 4 is a sectional view describing a configuration example of a DMFC (direct methanol fuel cell) according to the embodiment of the invention.

FIG. 4 is a sectional view describing a configuration example of a DMFC (direct methanol fuel cell) according to the embodiment of the invention.

As illustrated in FIG. 4, a methanol solution as a fuel 25 flows from an inlet 26a of a fuel supply section (a separator) 50 having a channel to a passage 27a to pass through a conductive gas diffusion layer 24a as a base to reach a catalyst electrode 22a supported by the gas diffusion layer 24a, and methanol and water react with each other on the catalyst electrode 22a by an anode reaction illustrated in a lower part in FIG. 4 to generate hydrogen ions, electrons, and carbon dioxide, and an exhaust gas 29a including carbon dioxide is discharged from an outlet 28a. The generated hydrogen ions pass through a polymer electrolyte membrane 23 formed of a proton-conductive composite electrolyte to reach a catalyst electrode 22b supported by the gas diffusion layer 24b, and the generated electrons pass through the gas diffusion layer 24a and an external circuit 70, and further pass through a conductive gas diffusion layer 24b as a base to reach the catalyst electrode 22b.

As illustrated in FIG. 4, air or oxygen 35 flows from an inlet 26b of an air/oxygen supply section (a separator) 60 having a channel to a passage 27b, and passes through the gas diffusion layer 24b to reach the catalyst electrode 22a supported by the gas diffusion layer 24b, and hydrogen ions, electrons, and oxygen react with one another on the catalyst electrode 22b by a cathode reaction illustrated in the lower part in FIG. 4 to generate water, and an exhaust gas 29b including water is discharged from an outlet 28b. As illustrated in the lower part in FIG. 4, a total reaction is a combustion reaction in which electrical energy is extracted from methanol and oxygen, and water and carbon dioxide are discharged.

Figure 5:
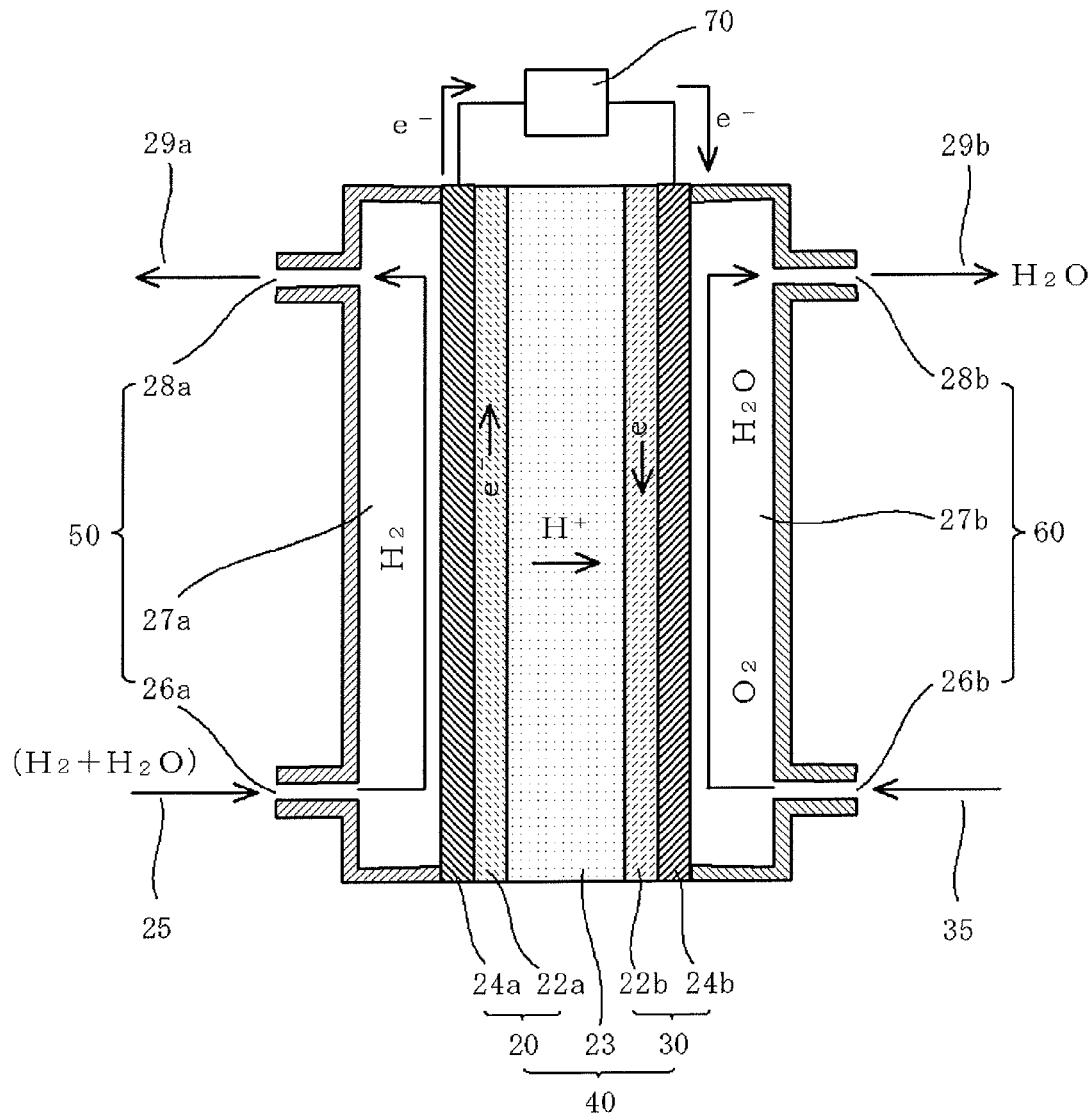
FIG. 5 is a sectional view describing a configuration example of a PEFC (polymer electrolyte fuel cell) according to the embodiment of the invention.

FIG. 5 is a sectional view describing a configuration example of a PEFC (polymer electrolyte fuel cell) according to the embodiment of the invention.

As illustrated in FIG. 5, a humidified hydrogen gas as the fuel 25 flows from the inlet 26a of the fuel supply section 50 to the passage 27a, and passes through the gas diffusion layer 24a to reach the catalyst electrode 22a, and hydrogen ions and electrons are generated from the hydrogen gas on the catalyst electrode 22a by an anode reaction illustrated in a lower part in FIG. 5, and the exhaust gas 29a including a redundant hydrogen gas is discharged from the outlet 28a. The generated hydrogen ions pass through the polymer electrolyte membrane 23 formed of the proton-conductive composite electrolyte to reach the catalyst electrode 22b, and the generated electrons pass through the gas diffusion layer 24a and the external circuit 70, and further pass through the gas diffusion layer 24b to reach the catalyst electrode 22b.

As illustrated in FIG. 5, air or oxygen 35 flows from the inlet 26b of the air/oxygen supply section 60 to the passage 27b, and passes through the gas diffusion layer 24b to reach the catalyst electrode 22a, and hydrogen ions, electrons, and oxygen react with one another on the catalyst electrode 22b by a cathode reaction illustrated in the lower part in FIG. 5 to generate water, and the exhaust gas 29b including water is discharged from the outlet 28b. As illustrated in the lower part in FIG. 5, a total reaction is a combustion reaction of a hydrogen gas in which electrical energy is extracted from the hydrogen gas and oxygen, and water is discharged.

In FIGS. 4 and 5, the polymer electrolyte membrane 23 is formed by binding a proton-conductive composite electrolyte by a binder (for example, polytetrafluoroethylene (PTFE), polyvinylidene fluoride (PVDF), or the like). An anode 20 and a cathode 30 are separated by the polymer electrolyte membrane 23, and hydrogen ions or water molecules are transferred through the polymer electrolyte membrane 23. The polymer electrolyte membrane 23 is a membrane with high hydrogen-ion conductivity, and is preferably chemically stable and has high mechanical strength.

In FIGS. 4 and 5, the catalyst electrodes 22a and 22b are formed closely on the gas diffusion layers 24a and 24b forming a conductive base which is a current collector and having permeability to a gas or a solution. The gas diffusion layers 24a and 24b are formed of a porous base such as carbon paper, a carbon compact, a carbon sintered body, sintered metal, or foam metal. To prevent a decline in gas diffusion efficiency due to water generated by driving a fuel cell, the gas diffusion layers are water-repellent with a fluorine resin or the like.

The catalyst electrodes 22a and 22b are formed by binding a carrier supporting a catalyst made of, for example, platinum, ruthenium, osmium, a platinum-osmium alloy, or a platinum-palladium alloy by a binder (for example, polytetrafluoroethylene, polyvinylidene fluoride (PVDF), or the like). As the carrier, an inorganic microparticle, for example, acetylene black, carbon such as graphite, alumina, or silica is used. The gas diffusion layers 24a and 24b are coated with a solution prepared by dispersing carbon particles (supporting catalyst metal) in an organic solvent including the binder dissolved therein, and the organic solvent is evaporated to form the catalyst electrodes 22a and 22b in a membrane form bound by the binder.

The polymer electrolyte membrane 23 is sandwiched between the catalyst electrodes 22a and 22b formed in close contact with the gas diffusion layers 24a and 24b, respectively, to form a membrane-electrode assembly (MEA) 40. The anode 20 is configured of the catalyst electrode 22a and the gas diffusion layer 24a, and the cathode 30 is configured of the catalyst electrode 22b and the gas diffusion layer 24b. The anode 20 and the cathode 30 are adhered to the polymer electrolyte membrane 23, and a proton conductor enters between carbon particles to impregnate the catalyst electrodes 22a and 22b with a polymer electrolyte (the proton conductor), and the catalyst electrodes 22a and 22 and the polymer electrolyte membrane 23 are closely bonded together, and high hydrogen-ion conductivity is maintained at a bonding interface, and electrical resistance is maintained low.

It is to be noted that in the examples illustrated in FIGS. 4 and 5, each of openings, i.e., the inlet 26a for the fuel 25, the outlet 28a for the exhaust gas 29a, the inlet 26b for air or oxygen ($O_2$) 35, and the outlet 28b for the exhaust gas 29b is arranged perpendicular to the surfaces of the polymer electrolyte membrane 23 and the catalyst electrodes 22a and 22b; however, each of the above-described openings may be arranged in parallel with the surfaces of the polymer electrolyte membrane 23 and the catalyst electrodes 22a and 22b, and the arrangement of each of the above-described openings may be variously modified.

As the fuel cells illustrated in FIGS. 4 and 5 are allowed to be manufactured by typical methods publicly known by various documents, and a method of manufacturing the fuel cells will not be described in detail.

Next, examples relating to the ion-conducting composite electrolyte membrane will be described below. In the following respective examples and comparative examples, as the PVdF-HFP copolymer, a copolymer with PVdF:HFP (a mole ratio) of 90:10 was used (in FIG. 3, n:m=90:10).

Moreover, logarithmic viscosity [η] was determined by $[\eta]=\ln(\eta_m)/C$, that is, by dividing a natural logarithm $\eta_m$ by a concentration C of a sample solution, where $\eta_m$ was a measured value of viscosity at 30° C. of a solution (a sample solution with a concentration C=4 (g/L)) prepared by dissolving 4 g of a the PVdF-HFP copolymer in 1 liter of N,N-dimethylformamide. The viscosity $\eta_m$ (Pa·s (pascal-second)) was determined at a shear rate (an angular velocity) where shear stress was constant when the shear rate is varied from 0 to 2000 (sec-1) by a viscometer (Rheostress 600, manufactured by HAAKE GmbH).

EXAMPLES

The logarithmic viscosity of the PVdF-HFP copolymer, properties of the electrolyte membrane using a fullerene derivative, and characteristics of a fuel cell using the electrolyte membrane will be described below. First, formation of the electrolyte membrane will be described.

Example 1

The logarithmic viscosity of the PVdF-HFP copolymer used in this example was [η]=2 ((dL/g) which is a dimension of [η] is not illustrated, and the same applies in the following description), and the molecular weight thereof was 550000, determined by gel permeation chromatography (GPC).

The fullerene derivative described in FIG. 2 as an ion conductor was used to form the electrolyte membrane by the following manner. The fullerene derivative was added to gamma-butyrolactone, and gamma-butyrolactone was stirred for 2 hours to disperse the fullerene derivative therein. It is to be noted that an organic solvent such as cyclopentanone, acetone, or propylene carbonate may be used. As a binder, 30 wt % with respect to the weight of the fullerene derivative of PVdF-HFP copolymer powder was added to a resultant dispersion liquid, and the dispersion liquid was stirred for 3 hours or over at 80° C. to uniformly disperse the fullerene derivative therein.

The dispersion liquid obtained in such a manner and including the fullerene derivative and the binder was uniformly spread over a base (glass was used herein; however, a polyimide film, a PET film, a PP film, or the like may be used) with use of a doctor blade, and was slowly dried in a clean bench to form a thin membrane. Moreover, the thin membrane was dried for 3 hours in a dryer maintained at 60° C., and then the dried thin membrane was removed from the base to obtain the electrolyte membrane. The electrolyte membrane with a thickness of 15 μm was formed in such a manner.

The thickness of the electrolyte membrane was controllable within a range of approximately 3 μm to 50 μm by changing the concentration of the binder (the concentration of the binder in the solvent; 1 wt % to 30 wt %) in the above-described dispersion liquid, and a coating amount per unit area.

Example 2

The logarithmic viscosity of the PVdF-HFP copolymer used in this example was $[\eta]=5$. An electrolyte membrane with a thickness of 15 μm was formed with use of the PVdF-HFP copolymer as in the case of Example 1.

Example 3

The logarithmic viscosity of the PVdF-HFP copolymer used in this example was $[\eta]=10$. An electrolyte membrane with a thickness of 15 μm was formed with use of the PVdF-HFP copolymer as in the case of Example 1.

Comparative Example 1

The logarithmic viscosity of the PVdF-HFP copolymer used in this comparative example was $[\eta]=1$. An electrolyte membrane with a thickness of 15 μm was formed with use of the PVdF-HFP copolymer as in the case of Example 1.

Comparative Example 2

The logarithmic viscosity of the PVdF-HFP copolymer used in this comparative example was $[\eta]=1.5$. An electrolyte membrane with a thickness of 15 μm was formed with use of the PVdF-HFP copolymer as in the case of Example 1.

It is to be noted that assuming that the logarithmic viscosity $[\eta]$ simply corresponded to the molecular weight, with reference to a logarithmic viscosity $[\eta]=2$ and a molecular weight of 5500000 of the PVdF-HFP copolymer used in Example 1, the logarithmic viscosities of the PVdF-HFP copolymers in Examples 2 and 3 and Comparative Examples 1 and 2 were 280000, 410000, 1380000, and 2750000, respectively.

(Tensile Test on Electrolyte Membranes)

A tensile test on the electrolyte membranes formed in the above manner was performed. The tensile test was performed with use of a test specimen with a length of 30 mm, a width of 10 mm, and a thickness of 15 mm at a temperature of 25° C., a relative humidity of 45%, and a tension rate of 60 mm/min with use of a tensile tester, INSTRON model 5564 (manufactured by INSTRON Corporation).

Figure 6:
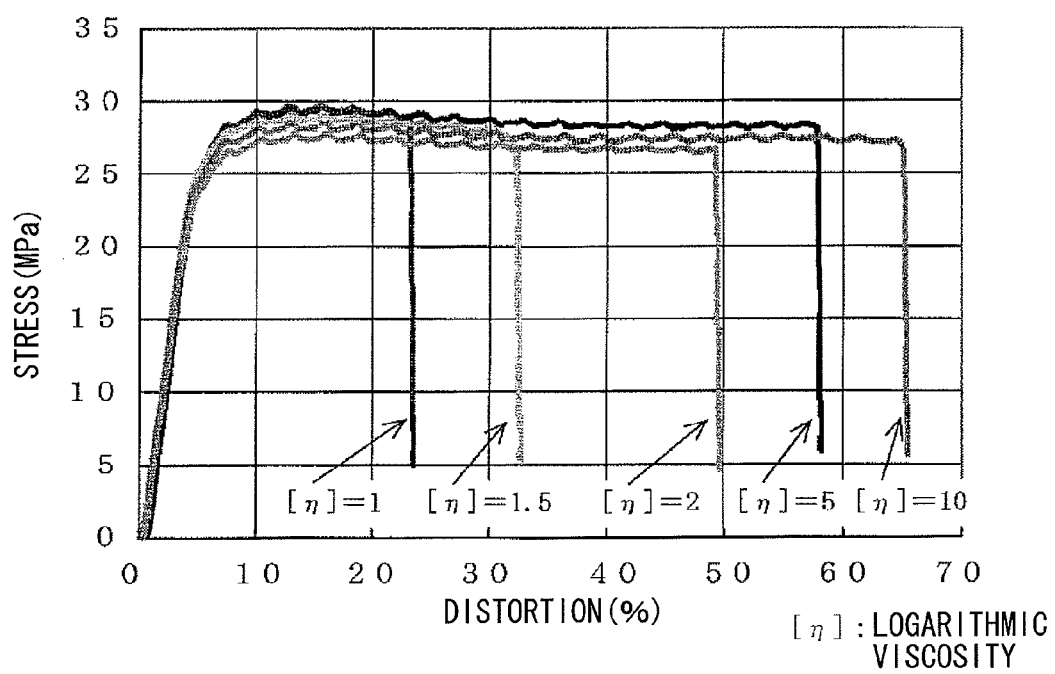
FIG. 6 is a diagram describing a relationship between logarithmic viscosity of a polymer material and tensile strength of an electrolyte membrane in examples of the invention.

FIG. 6 is a diagram describing a relationship between logarithmic viscosity of a polymer material (the PVdF-HFP copolymer) and tensile strength of the electrolyte membrane in the examples of the invention. In FIG. 6, a horizontal axis indicates distortion (%), and a vertical axis indicates stress (MPa), and $[\eta]$ indicates logarithmic viscosity.

In FIG. 6, test curves of the electrolyte membranes in Example 3 ($[\eta]=10$), Example 2 ($[\eta]=5$), Example 1 ($[\eta]=2$), Comparative Example 2 ($[\eta]=1.5$), and Comparative Example 1 ($[\eta]=1$) are illustrated in order from the left. Results obtained from these test curves are illustrated in FIG. 7.

Figure 7:
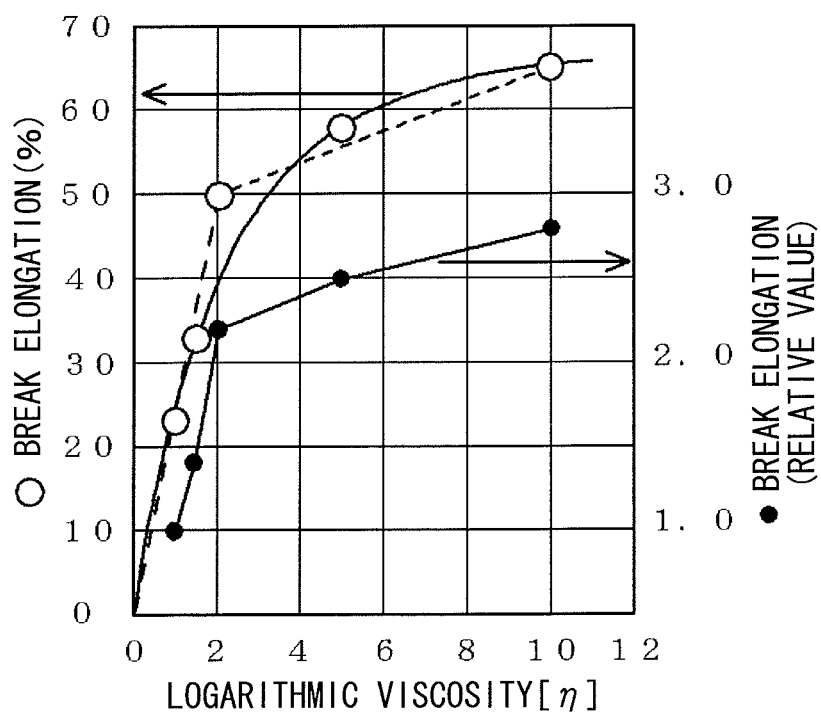
FIG. 7 is a diagram describing a relationship between logarithmic viscosity of the polymer material and break elongation of an electrolyte membrane using a fullerene derivative in the examples of the invention.

FIG. 7 is a diagram describing a relationship between logarithmic viscosity $[\eta]$ of the polymer material (the PVdF-HFP copolymer) and break elongation of the electrolyte membrane using a fullerene derivative in the examples of the invention. FIG. 7(A) illustrates a relationship between the logarithmic viscosity $[\eta]$ of the PVdF-HFP copolymer and break elongation (%; a relative value (a relative value with respect to Comparative Example 1)), and FIG. 7(B) graphically illustrates the relationship.

It is obvious from the results illustrated in FIG. 7 that changes in break elongation with logarithmic viscosity $[\eta]$ are represented by a substantially straight line, and are represented by a different straight line from $[\eta]=2$, and logarithmic viscosity is gradually changed within a range of $[\eta]\geq2$. FIG. 7 indicated that with an increase in the logarithmic viscosity of the PVdF-HFP copolymer, that is, with an increase in the molecular weight, the tension of the electrolyte membrane increased until a break, and the strength thereof increased, thereby allowing the electrolyte membrane to have higher tensile strength.

Next, properties of the electrolyte membranes in Examples 1, 2, and 3 and Comparative Examples 1 and 2, and characteristics of fuel cells including the electrolyte membranes will be described below.

(Measurement of Swelling Degree of Electrolyte Membrane)

The swelling degree of the electrolyte membrane was measured as one of properties of the electrolyte membrane. To measure the swelling degree, the electrolyte membrane was dried under reduced pressure for 12 hours or over in a dry room maintained at 60° C., and then the weight ($W_{dry}$) of the electrolyte membrane was measured. Next, the dried electrolyte membrane was immersed in pure water for 1 hour or over, and then the electrolyte was taken out of pure water, and water on the surfaces of the electrolyte membrane was removed, and then the weight ($W_{wet}$) thereof was measured. The swelling degree was determined by $(W_{wet}-W_{dry})/W_{dry}\times100$.

(Characteristics of Fuel Cell)

Fuel cells using the electrolyte membranes in Examples 1, 2, and 3, and Comparative Examples 1 and 2 were formed in the following manner.

Platinum-supported carbon (manufactured by Tanaka Kikinzoku Kogyo K. K.) was dispersed in a Nafion (manufactured by E. I. du Pont de Nemours and Company; a registered trademark) dispersion liquid to adjust viscosity, thereby forming a catalyst ink, and a gas diffusion layer made of carbon paper (manufactured by Toray Industries, Inc.) was coated with the catalyst ink to form a cathode-side catalyst electrode. Moreover, platinum-ruthenium black (manufactured by BASF) was dispersed in a Nafion (manufactured by E. I. du Pont de Nemours and Company; a registered trademark) dispersion liquid to adjust viscosity, thereby forming a catalyst ink, and a gas diffusion layer made of carbon paper (manufactured by Toray Industries, Inc.) was coated with the catalyst ink to form an anode-side catalyst electrode.

The gas diffusion layers on the anode side and the cathode side were bonded to the electrolyte membrane with a pressure of 0.5 kN for 15 minutes at 130° C. to form a membrane-electrode assembly (electrolyte membrane-catalyst electrode, MEA). A unit cell was formed with use of the membrane-electrode assembly, and a planar stack type fuel cell including 3 (vertical)×2 (horizontal) unit cells two-dimensionally arranged was formed as in the case of the fuel cell illustrated in FIG. 10 of PTL 9. As a fuel, 100% methanol was supplied to the anode of the planar stack type fuel cell, and as an oxidizing agent, air was supplied to the cathode by natural aspiration. It is to be noted that the fuel cell operates in the same manner as that of the above-described direct type fuel cell in FIG. 4.

The characteristics of the fuel cells formed in the above-described manner were measured, and the temperatures of the unit cells of the fuel cells were also measured. The results are indicated below.

Figure 8:
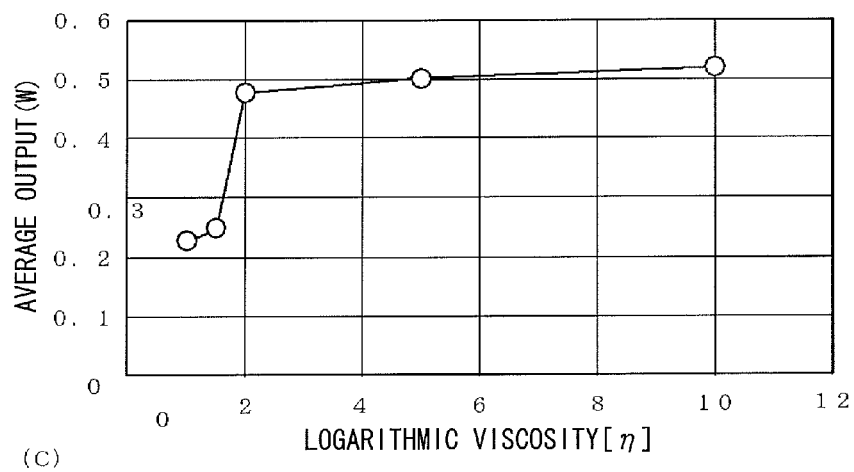
FIG. 8 is a diagram describing a relationship between logarithmic viscosity of a PVdF-HFP copolymer, and properties of the electrolyte membrane and characteristics of a fuel cell in the examples of the invention.
Figure 8:
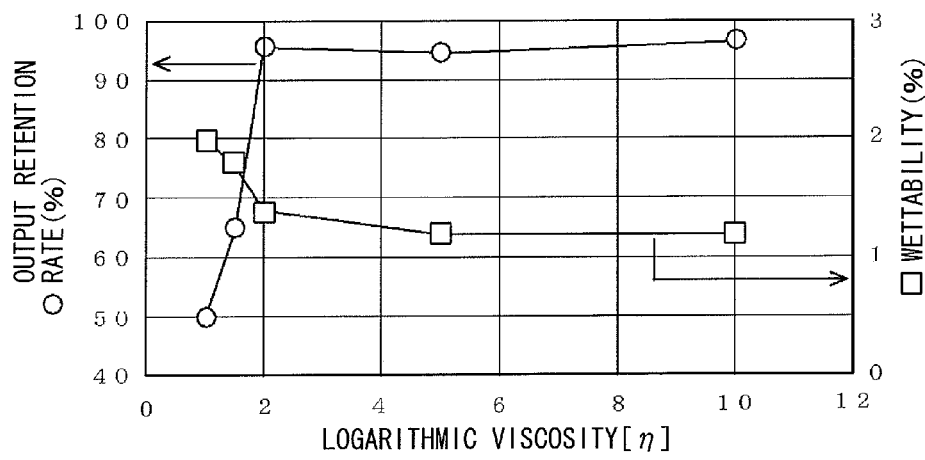

FIG. 8 is a diagram describing a relationship between logarithmic viscosity [η] of the PVdF-HFP copolymer, the properties of the electrolyte membrane, and the characteristics of the fuel cell in the examples of the invention. FIG. 8(A) illustrates a relationship between logarithmic viscosity [η] of the PVdF-HFP copolymer, an average output (W) of the fuel cell, an output retention rate (%), an exfoliation state of an electrode, and a swelling degree (%) of the electrolyte membrane, and FIGS. 8(B) and 8(C) graphically illustrate the relationship.

Figure 9:
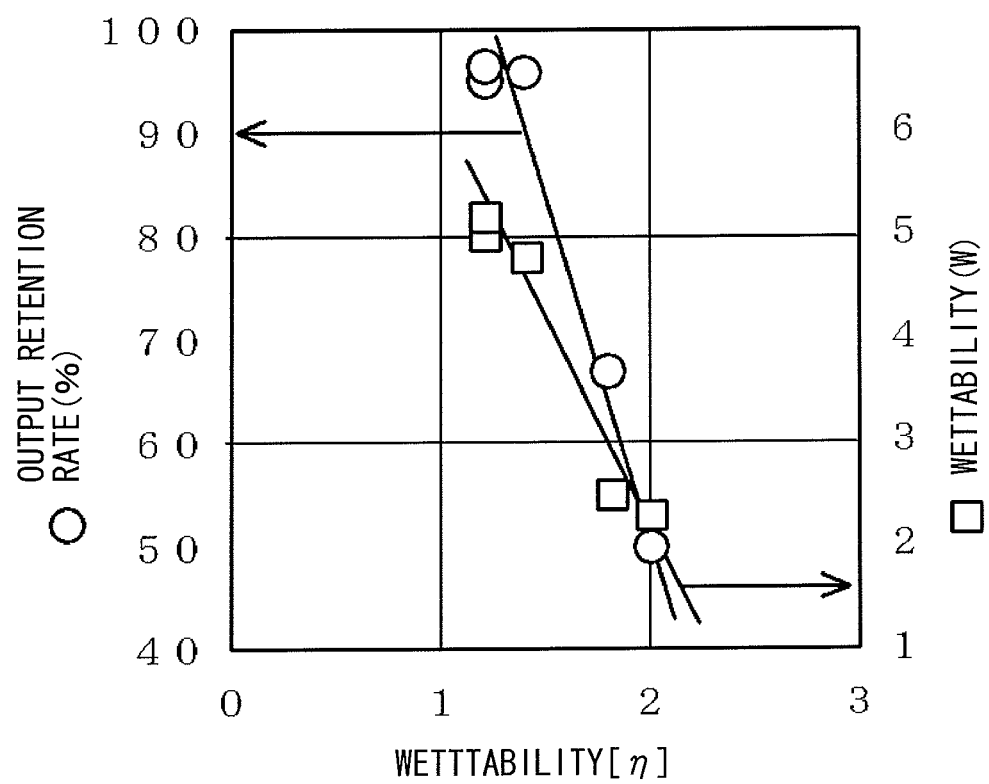
FIG. 9 is a diagram describing a relationship between swelling degree of the electrolyte membrane, and an output retention rate and an average output in the examples of the invention.

FIG. 9 is a diagram describing a relationship between the swelling degree of the electrolyte membrane, and the output retention rate and the average output, and graphically illustrates the relationship (illustrated in FIG. 9(A)).

In FIGS. 8 and 9, the average output indicates an average output value in two-hour power generation, and the output retention rate is represented by an output at the completion of a start-stop test in which 300 cycles of one-hour power generation and one-hour stop are performed, with respect to an output at the start of initial power generation in percentage. Moreover, as an electrode break illustrated in FIG. 9, when the unit cell of the fuel cell was disassembled after the completion of the start-stop test, a state where the catalyst electrode and the electrolyte membrane were separated from each other was indicated by a "cross" mark, and a state where the catalyst electrode and the electrolyte membrane were firmly bonded together was indicated by a "circle" mark.

As illustrated in FIGS. 8(B) and 8(C), the average output and the output retention rate increased with an increase in logarithmic viscosity [η], and abruptly increased until the logarithmic viscosity [η]=2, and increased extremely gradually at the logarithmic viscosity [η]=2 or over.

Moreover, as illustrated in FIG. 8(C), the swelling degree of the electrolyte membrane decreased with an increase in logarithmic viscosity [η], and abruptly decreased until the logarithmic viscosity [η]=2, and decreased extremely gradually at the logarithmic viscosity [η]=2 or over to have a substantially constant value.

As illustrated in FIG. 9, when a relationship between the swelling degree of the electrolyte membrane, and the average output and the output retention rate was observed, the average output and the output retention rate were greatly changed with the swelling degree of the electrolyte membrane. However, FIG. 9 indicated that in the case where the swelling degree of the electrolyte membrane was as small as 1.4% or less, that is, in the case where the logarithmic viscosity [η] of the PVdF-HFP copolymer used for formation of the electrolyte membrane was 2 or over, the average output and the output retention rate approached a substantially constant value.

As described above, in the case where the logarithmic viscosity of the PVdF-HFP copolymer used for formation of the electrolyte membrane was as large as [η]≥2, the strength of the formed electrolyte membrane and handling performance were improved, thereby improving the average output.

Moreover, the temperature of the unit cell measured concurrently with the measurement of the characteristics of the fuel cell was lower in the case of the electrolyte membrane including the PVdF-HFP copolymer used for formation of the electrolyte membrane and having a higher logarithmic viscosity [η], and it was confirmed that crossover of a fuel due to a break in an electrode edge section was inhibited.

When the unit cell was disassembled after the characteristics of the fuel cell were measured, a break was observed in an electrode edge section in the electrolyte membrane including the PVdF-HFP copolymer used for formation of the electrolyte membrane and having a low logarithmic viscosity [η].

The output retention rate illustrated in FIGS. 8 and 9 was improved, because in formation of the electrolyte membrane, the PVdF-HFP copolymer with a high logarithmic viscosity [η] was used as the binder to inhibit swelling of the electrolyte membrane, thereby inhibiting exfoliation of the electrolyte membrane from the catalyst electrode.

As described above, when the electrolyte membrane was formed with use of the PVdF-HFP copolymer with a molecular weight of 550000 or over (a logarithmic viscosity [η] of 2 or over), and the electrolyte membrane was included in the fuel cell, the occurrence of a crack or the like in the electrolyte membrane was reduced, and the power generation characteristics of the fuel cell were improved, and swelling of the electrolyte membrane was inhibited; therefore, as illustrated in the results of the start-stop test, a deterioration due to a start-stop operation was allowed to be inhibited. In other words, the electrolyte membranes using a fullerene derivative in Examples 1, 2, and 3 had superior properties such as a reduction in wettability and an improvement in strength, and the proton conductivity of the electrolyte membrane in a state where the electrolyte membrane was included in the fuel cell, and the fuel cell was operating was not impaired; therefore, the fuel cell including the electrolyte membrane had superior characteristics.

Next, the logarithmic viscosity of the PVdF-HFP copolymer and properties of an electrolyte membrane using a pitch material, and characteristics of a fuel cell using the electrolyte membrane will be described below.

As a carbon cluster including an ion-dissociating functional group, a pitch material into which a sulfonic acid group was introduced (sulfonated pitch) was used to form an electrolyte membrane in the following manner.

The sulfonated pitch was synthesized by the following manner. First, coal tar (manufactured by Wako Pure Chemical Industries, Ltd.; 10 g) was put into a round-bottomed flask, and air in the flask substitutes for a nitrogen airflow, and then, the flask including the coal tar was put into an ice bath, and the coal tar was gently stirred with a stirring bar. Next, while the flask was sufficiently cooled with ice, 200 mL of 25-mass %-fuming sulfuric acid (manufactured by Wako Pure Chemical Industries, Ltd.) was carefully dropped into the flask little by little not to cause heat generation. Further, while the flask was dipped in the ice bath, the coal tar was vigorously stirred at room temperature. After 3 hours, while the flask was dipped in the ice bath, ion exchange water (500 mL) was carefully added not to increase the temperature thereof too high. A resultant suspension was subjected to a centrifugal separation process to remove a supernatant fluid. Such an operation (washing operation) of subjecting a suspension obtained by adding ion exchange water (500 mL) to a centrifugal separation process to remove a supernatant fluid was performed 5 or more times. After it was confirmed that the supernatant fluid did not include sulfate ions, a resultant precipitate was vacuum-dried at ambient temperatures to obtain a black (slightly brown-tinted) aggregate (7 g). The resultant aggregate was pulverized with use of a ball mill (manufactured by Fritsch GmbH), and fine powder having passed through a sieve with a 32 μm mesh was recovered.

As results of organic element analysis of the sulfonated pitch obtained in such a manner, carbon (C), hydrogen (H), sulfur (S), and nitrogen (N) were 44.5 wt %, 3.38 wt %, 14.97 wt %, and 0 wt %, respectively. From the analysis results, in the case where all sulfur (S) was sulfonated, the density of sulfonic acid was calculated to be 4.68 mmol/g.

Example 4

An electrolyte membrane was formed with use of the above-described sulfonated pitch in the following manner. The sulfonated pitch was added to gamma-butyrolactone, and gamma-butyrolactone was stirred for 2 hours to disperse the sulfonated pitch therein. It is to be noted that an organic solvent such as cyclopentanone, acetone, or propylene carbonate may be used. As a binder, 30 wt % with respect to the weight of the sulfonated pitch of the PVdF-HFP copolymer (with a logarithmic viscosity $[\eta]=2$) used in Example 1 was added to a resultant dispersion liquid, and the dispersion liquid was stirred for 3 hours or over at 80° C. to uniformly disperse the sulfonated pitch therein.

The dispersion liquid including the sulfonated pitch obtained in such a manner and the binder was uniformly spread over a base (glass was used herein; however, a polyimide film, a PET film, a PP film, or the like may be used) with use of a doctor blade, and was slowly dried in a clean bench to form a thin membrane. Moreover, the thin membrane was dried for 3 hours in a dryer maintained at 60° C., and then the dried thin membrane was removed from the base to obtain the electrolyte membrane.

The thickness of the electrolyte membrane is controllable within a range of approximately 3 μm to 50 μm by changing the concentration of the binder (the concentration of the binder in the solvent; 1 wt % to 30 wt %) in the above-described dispersion liquid, and a coating amount per unit area.

Example 5

An electrolyte membrane with a thickness of 15 μm was formed with use of the PVdF-HFP copolymer (with a logarithmic viscosity $[\eta]=5$) used in Example 2 as in the case of Example 4.

Example 6

An electrolyte membrane with a thickness of 15 μm was formed with use of the PVdF-HFP copolymer (with a logarithmic viscosity $[\eta]=10$) used in Example 3 as in the case of Example 4.

Comparative Example 3

An electrolyte membrane with a thickness of 15 μm was formed with use of the PVdF-HFP copolymer (with a logarithmic viscosity $[\eta]=1$) used in Comparative Example 1 as in the case of Example 4.

Comparative Example 4

An electrolyte membrane with a thickness of 15 μm was formed with use of the PVdF-HFP copolymer (with a logarithmic viscosity $[\eta]=1.5$) used in Comparative Example 2 as in the case of Example 4.

(Tensile Test on Electrolyte Membranes)

A tensile test on the electrolyte membranes formed in the above manner was performed. The same tensile test as the above-described tensile test on the electrolyte membranes using the fullerene derivative was performed. Results are indicated below.

Figure 10:
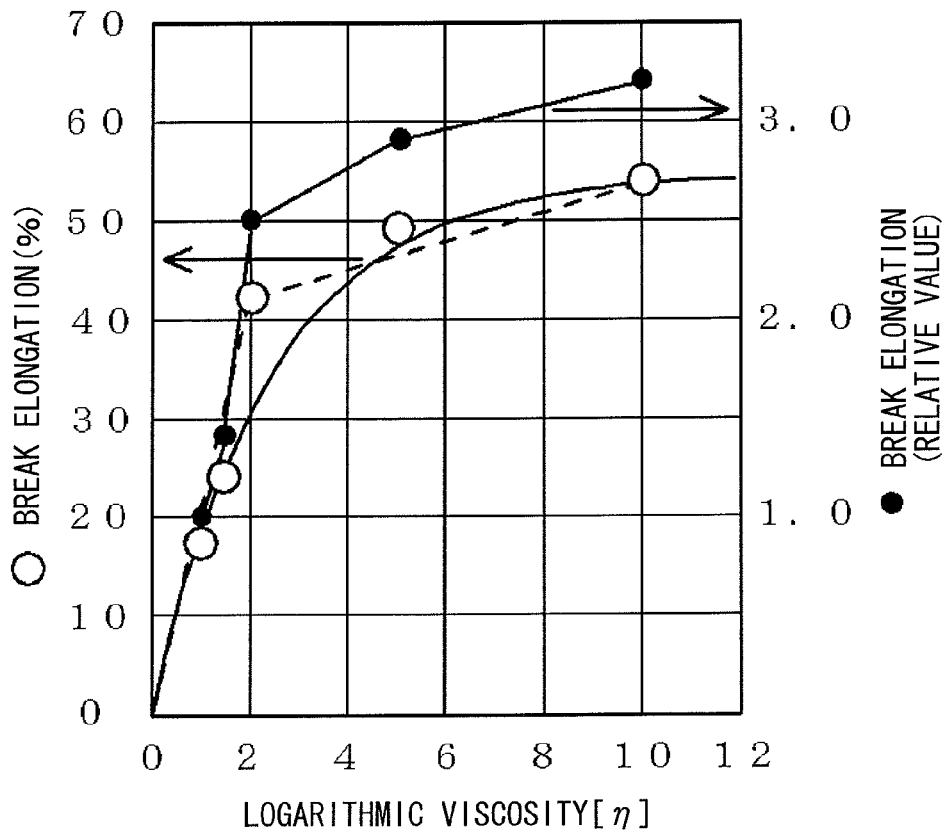
FIG. 10 is a diagram describing a relationship between logarithmic viscosity of the polymer material and break elongation of an electrolyte membrane using a pitch material in examples of the invention.

FIG. 10 is a diagram describing a relationship between logarithmic viscosity of the polymer material (the PVdF-HFP copolymer) and break elongation of the electrolyte membrane using the pitch material in the examples of the invention. FIG. 11(A) illustrates a relationship between logarithmic viscosity of the PVdF-HFP copolymer and break elongation (%; a relative value (a relative value with respect to Comparative Example 3), and FIG. 11(B) graphically illustrates this relationship.

Results illustrated in FIG. 10 are similar to those illustrated in FIG. 7 in the case of the electrolyte membranes using the fullerene derivative, and break elongation exhibits a different behavior with respect to $[\eta]$ from logarithmic viscosity $[\eta]=2$, and with an increase in the logarithmic viscosity of the PVdF-HFP copolymer, that is, with an increase in the molecular weight, the tension of the electrolyte membrane increased until a break, and the strength thereof increased.

(Characteristics of Fuel Cell)

Fuel cells (planar stack type fuel cells) using the electrolyte membranes in Examples 4, 5, and 6 and Comparative Examples 3 and 4 were formed as in the case of the fuel cells (planar stack type fuel cells) using the electrolyte membranes in Examples 1 to 3 and Comparative Example 1 and 2. The measurement of characteristics of the formed fuel cells was performed as in the case of the evaluation of the characteristics of the fuel cells using the electrolyte membranes in Examples 1 to 3 and Comparative Example 1 and 2. Results are illustrated in FIG. 11.

Figure 11:
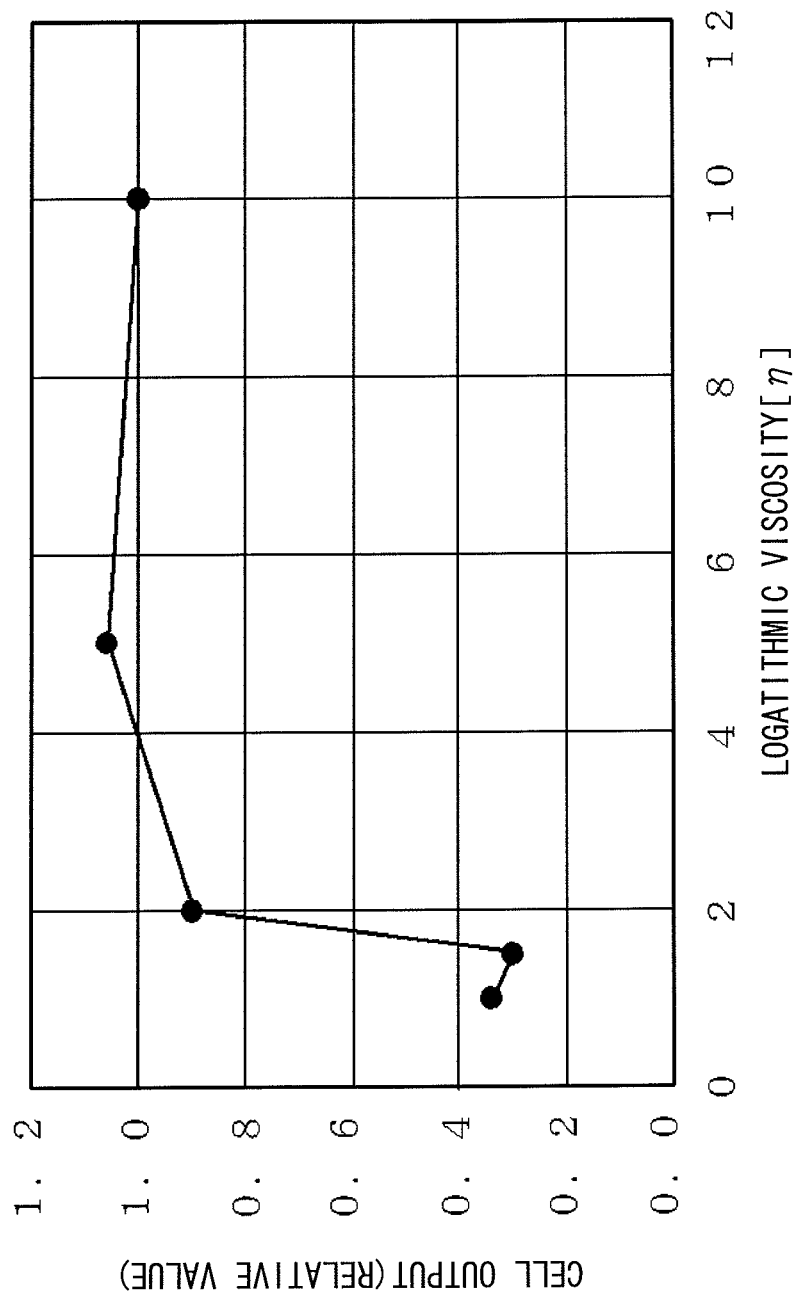
FIG. 11 is a diagram describing a relationship between logarithmic viscosity of the polymer material and characteristics of a fuel cell which includes the electrolyte membrane using the pitch material in the examples of the invention.

FIG. 11 is a diagram describing a relationship between logarithmic viscosity of the polymer material (the PVdF-HFP copolymer) and the characteristics of the fuel cell which included the electrolyte membrane using the pitch material. In FIG. 11, a horizontal axis indicates the logarithmic viscosity $[\eta]$ of the PVdF-HFP copolymer used for formation of the electrolyte membrane, and a vertical axis indicates a relative output value of the fuel cell (relative to the case of $[\eta]=10$).

The results illustrated in FIG. 11 are extremely similar to the results of output characteristics of the fuel cells which included the electrolyte membrane using the fullerene derivative illustrated in FIG. 8, and an output abruptly increased from the logarithmic viscosity $[\eta]=2$ of the PVdF-HFP copolymer used for formation of the electrolyte membrane, and in the case where the logarithmic viscosity of the PVdF-HFP copolymer used for formation of the electrolyte membrane was as large as $[\eta]\geq 2$, the strength of the formed electrolyte membrane and handling performance were improved, thereby improving the output.

Moreover, as in the case of the electrolyte membranes using the fullerene derivative in Examples 1, 2, and 3, the electrolyte membranes using the pitch material in Examples 3, 4, and 5 also had superior properties; therefore, the fuel cells including the electrolyte membranes also had superior characteristics.

It is obvious from the results illustrated in FIGS. 8 and 11 that in the case where the logarithmic viscosity $[\eta]$ of the PVdF-HFP copolymer used for formation of the electrolyte membrane was 3 or over, the output of the fuel cell reliably approached a substantially constant value.

The strength of the electrolyte membrane, changes in wettability with the logarithmic viscosity $[\eta]$ of the binder, and changes in output of the fuel cell using the electrolyte membrane with the logarithmic viscosity $[\eta]$ of the binder which were obtained in the above-described examples were first found out in this invention, and accordingly, the strength of the electrolyte membrane was allowed to be improved without impairing proton conductivity, and a fuel cell with superior output characteristics was allowed to be achieved with use of the electrolyte membrane.

It is to be noted that in the above description, an example in which the fullerene derivative or the pitch material is used as the electrolyte, and the PVdF-HFP copolymer is used as a binder is described; however, the invention is obviously applicable to an electrolyte membrane using another electrolyte and another fluorine-based resin as a binder.

Although the present invention is described referring to the embodiment, the invention is not limited to the above-described embodiment, and may be variously modified within the technical ideas of the invention.

[Industrial Applicability]

According to the present invention, an ion-conductive electrolyte membrane suitably applicable to a fuel cell is allowed to be provided.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An ion-conducting composite electrolyte membrane comprising a mixture of:
    a carbon cluster including an ion-dissociating group; and
    a fluorine-based polymer with a weight-average molecular weight of 550000 or over and a logarithmic viscosity of 2 dL/g or over,
    wherein the fluorine-based polymer includes at least one kind selected from the group consisting of polyvinylidene fluoride and copolymers of vinylidene fluoride and hexafluoropropylene, and
    wherein the ion-dissociative group is a proton-dissociative group and includes a disulfono methano group ($=C(SO_3H)_2$).

2. The ion-conducting composite electrolyte membrane according to claim 1, wherein
    the logarithmic viscosity of the fluorine-based polymer is 10 dL/g or less.

3. The ion-conducting composite electrolyte membrane according to claim 2, wherein
    the logarithmic viscosity of the fluorine-based polymer is 3 dL/g or over.

4. The ion-conducting composite electrolyte membrane according to claim 1, wherein
    the fluorine-based polymer is mixed within a range of 15 wt % to 95 wt % both inclusive.

5. A fuel cell comprising:
    an ion-conducting composite electrolyte membrane according to claim 1 sandwiched between facing electrodes.

6. The ion-conducting composite electrolyte membrane according to claim 1, wherein
    the proton-dissociative group further includes at least one of a bis-sulfonimide group ($-SO_2NHSO_2-$), and sulfonamide groups ($-SO_2NH_2$) and $-PO(OH)-$.

7. The ion-conducting composite electrolyte membrane according to claim 1, wherein the fluorine-based polymer is a copolymer of polvinylidene fluoride (PVdF) and hexafluoropropylene (HFP) having a mole ratio of PVdF:HFP of about 90:10.

* * * * *